May 23, 1933.  A. KLINKHAMMER ET AL  1,910,109
CULTIVATOR ATTACHMENT FOR GRAIN DRILLS
Filed March 17, 1932   2 Sheets-Sheet 2
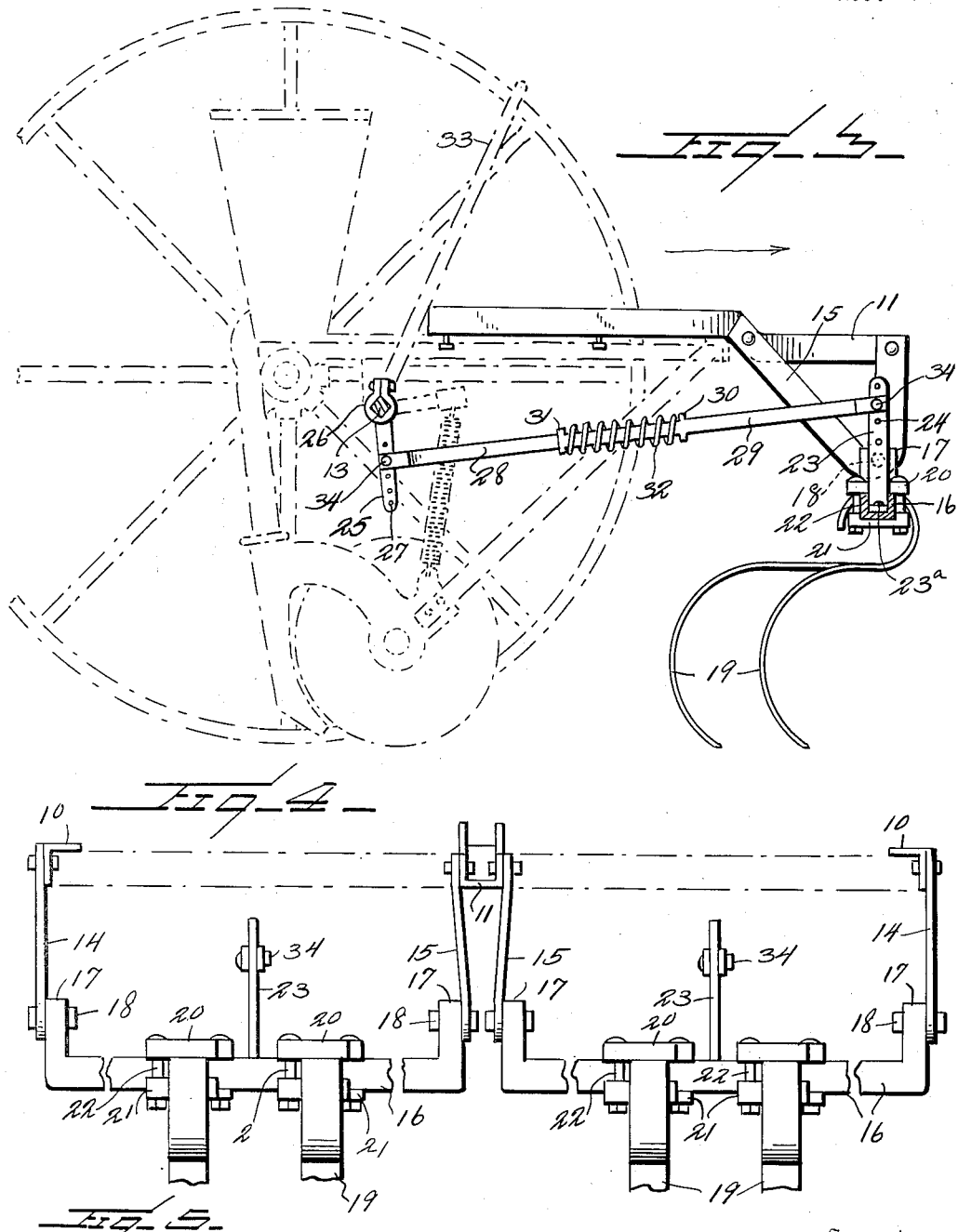

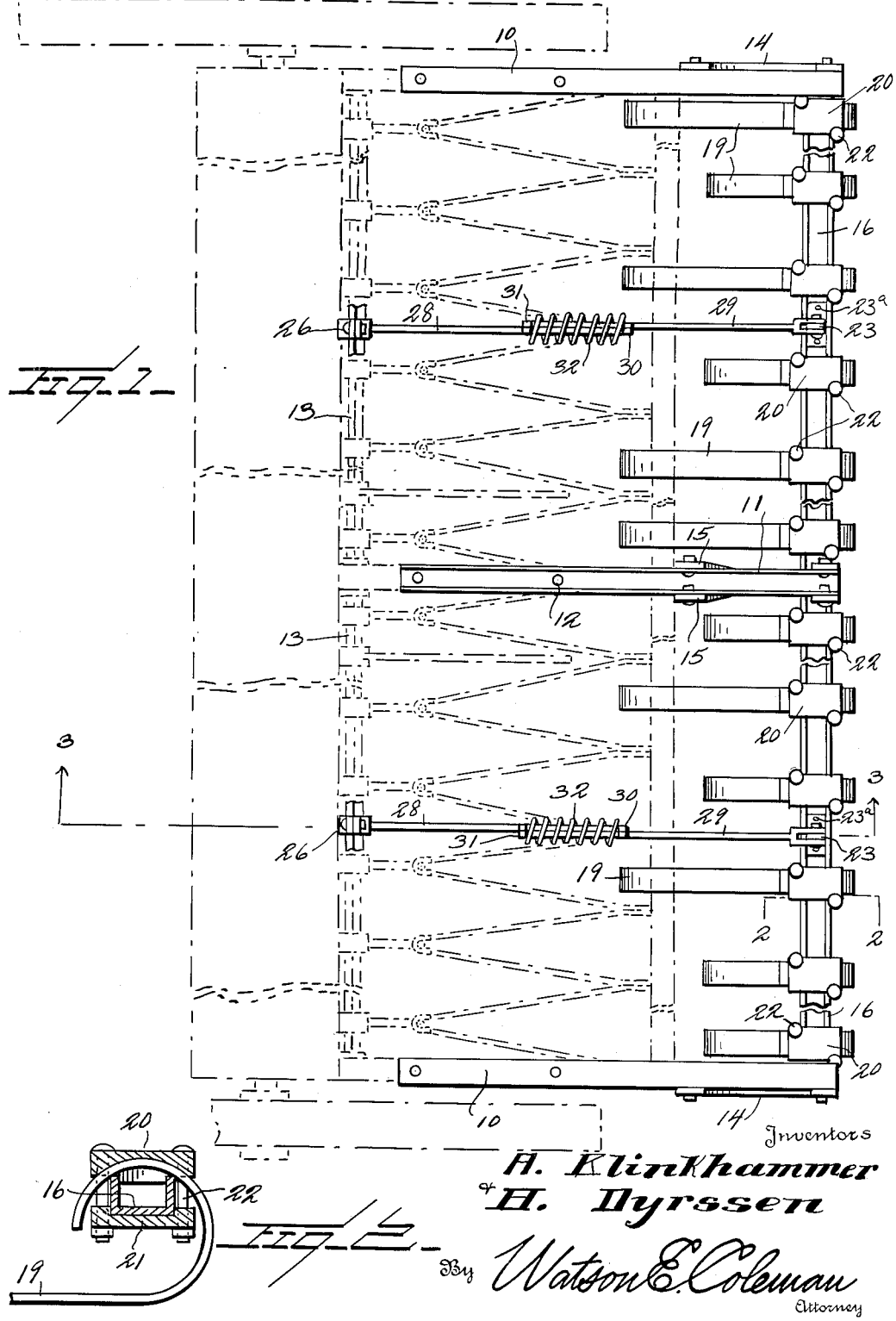

Patented May 23, 1933

1,910,109

UNITED STATES PATENT OFFICE

ALBERT KLINKHAMMER AND HENRY DYRSSEN, OF WARWICK, NORTH DAKOTA

CULTIVATOR ATTACHMENT FOR GRAIN DRILLS

Application filed March 17, 1932. Serial No. 599,546.

This invention relates to cultivating devices and particularly to a cultivator adapted to be applied to a seed drill for the purpose of cultivating the ground in advance of the drills to thus effect both cultivation and drilling at one operation and thus reduce the cost of both operations, this cultivator attachment acting to loosen the soil in front of the drills which is otherwise likely to be packed by the tractor or by the draft animals drawing the drill.

One of the general objects of the invention is to provide a very simply constructed easily applied structure of this character which is adapted to be applied to any planter or drill known to me and which is so constructed that the depth of penetration of the teeth of the cultivator may be readily adjusted.

A further object is to provide means whereby the teeth which are preferably spring teeth may be each clamped upon the tooth carrying shaft of the attachment, the clamping means permitting the ready detachment of any tooth to permit its replacement or repair or to permit more or less teeth to be used to thus space the teeth from each other to a greater or less extent.

A further object is to provide means for connecting the operating mechanism of the said shaft to the operating shaft or press shaft of the grain drill.

A further object is to provide the cultivating attachment with two tooth carrying shafts disposed in alinement with each other and each operated from one of the press shafts of the grain drill so that when one set of drills is operated and the other set is not, only one set of cultivator teeth may be used.

Other objects will appear in the course of the following description.

Our invention is illustrated in the accompanying drawings, wherein:—

Figure 1 is a top plan view of the attachment, the figure showing in dotted lines and diagrammatically a portion of the grain drill to which the attachment is applied;

Figure 2 is a section one the line 2—2 of Figure 1;

Figure 3 is a section on the lines 3—3 of Figure 1, the grain drill mechanism being shown in dotted lines;

Figure 4 is a fragmentary front elevation of the attachment;

Figure 5 is a vertical transverse section showing the two-part construction of the grain drill operating shaft as commonly found on grain drills.

Referring to these drawings, it will be seen that I have provided three supporting elements, two of these supporting elements being designated 10 and preferably being angular in cross section as shown in Figure 4 and an intermediate channel-shaped supporting element 11. These supporting elements are mounted upon the frame of the seed planter in any suitable manner as by the bolts 12.

All of these supporting elements extend rearward toward the grain drill operating shaft sections 13 which are used for raising or lowering the grain drill shoes. Detachably bolted to the members 10 and 11 are the downwardly extending U-shaped brackets 14 and 15 as shown particularly in Figure 4. There is disposed between each of the brackets 15 and the corresponding bracket 14 on that side a shaft 16. This shaft is cranked or bent upward at its ends at 17 and these ends are bolted by bolts 18 to the brackets 14 and 15 respectively. The shaft sections 16 are preferably channel-shaped in cross section, as illustrated in Figure 2.

Associated with the channel-shaped shaft sections are the spring teeth 19. The inner ends of these spring teeth are bent upward and then forward while the forward ends of the teeth extend upward, forward and then downward. The rear ends of the teeth as shown in Figure 2 rest upon the upper edges of the channel-shaped shaft section 16 and are held in place by the clamping heads 20 and 21 through which the bolts 22 pass, these bolts being disposed diagonally with relation to each other. The clamping heads 20 and 21 are recessed to receive the upwardly and forwardly curved rear portion of each spring tooth so that the teeth cannot turn or shift when the clamping bolts 22 are properly tightened. At the same time by loosening the clamping bolts, the teeth may be removed or replaced or the teeth may be shifted nearer to or further from each other. Preferably, the teeth, as illustrated in Figure 1 are alternately of different lengths so that the teeth have a staggered relation at their points. This secures a wider effective space for refuse and trash to pass through between the teeth and yet still spaces the teeth closely enough together to properly cultivate the soil.

By making the beam or shaft in two sections 16, it is possible to control each half separately which is a very desirable feature.

Attached to each shaft section 16 is an upwardly extending arm 23, this arm having a flange at its lower end which is attached to the beam or shaft section 16 by a screw or like means 23a. This arm 23 is preferably formed with a plurality of apertures 24. The operating shaft 13 for the planter carries upon it an arm 25 which at its upper end is detachably clamped upon the shaft 13 by means of the clamp 26, this clamp being so formed as to permit the arm 25 to be removed from the operating shaft 13 or shifted along this shaft or otherwise adjusted. This arm 25 is also provided with a plurality of apertures 27.

Connecting each of the arms 25 with the corresponding arm 23 is a link preferably formed in two sections 28 and 29. The section 28 is provided at its forward end with a head 30 while the section 29 is provided at its rear end with a head 31. Between these two heads there is disposed the coil compression spring 32. This spring is sufficiently stiff so that when the shaft 13 is rocked to elevate the grain drills, the corresponding shaft section 16 will also be rocked in a direction to elevate the spring teeth 19. Yet if the teeth should strike an obstruction tending to force the teeth rearward and upward and cause the rocking of the shaft section 16, the spring 32 will yield so as to prevent the teeth from being broken or strain being applied to the planter operating shaft 13. There are two operating shafts 13 as shown in Figure 5, this being usual on grain drills and each of these shafts is controlled by a foot or hand lever or pedal. A lever 33 is illustrated in dotted lines in Figure 3 for this purpose.

Of course, it will be understood that the shaft sections 13 are operatively connected to the drill disks or shoes so that by the operation of one of the levers 33, the drill disks or shoes connected thereto will be raised or lowered and simultaneously the corresponding teeth 19 will be raised or lowered.

It will be seen that by forming the shaft sections 16 of channel iron and bending the ends of the channel iron upward as at 17 and pivoting them by means of the bolts 18, I provide for a relatively cheap construction of these shaft sections 16 and secure great strength in these shaft sections without the necessity of having special shafts made for this purpose or providing bearing boxes in the brackets within which these shaft sections would operate. By providing a plurality of apertures 24 in the arms 23 and apertures 27 in the arms 25, I provide for raising or lowering either end of the link composed of the sections 28 and 29 by simply adjusting the bolts 34 which pass through the forked ends of these sections 28 and 29 and connect them to the arms 22 and 25 respectively. By adjusting one end or the other end of the link and their respective arms 22 and 25, I can readily adjust the depth of penetration of the teeth, that is, the degree to which the teeth can be raised or lowered and also secure adjustment of the height of lift.

In operation, the teeth are lowered into the soil automatically as the drill disks or shoes are lowered into the soil and when so lowered, the teeth loosen and cultivate the soil ahead of the disks or shoes and back of the tractor or horses so that the soil which may be packed by the tractor or by the horses is loosened before the grain drill shoes have to penetrate it.

The attachment, as before stated, can be applied to any grain drill of standard construction and may be readily taken off at any time when desired. All the parts are detachable from each other so as to make the repair or replacement of the parts a very simple matter. The teeth are easily replaceable and it is an easy matter to use a greater or less number of teeth and to space these teeth a greater or less distance from each other. While I have illustrated certain details of construction and arrangement of parts, it is obvious that many minor changes might be made within the scope of the claims without departing from the spirit of the invention as defined thereby.

We claim:—

1. A cultivator attachment for grain drills including supporting elements having means whereby they may be engaged with the frame of a drill and projecting forwardly therefrom, brackets mounted on the supporting elements, an oscillatable shaft carried by said brackets, ground engaging teeth carried by the shaft, an arm on the shaft, an arm formed for detachable engagement with the operating shaft of the grain drill, and a link connecting the arms.

2. A cultivator attachment for grain drills including supporting elements having means whereby they may be engaged with the frame of a drill and projecting forward therefrom, brackets mounted on the supporting elements, an oscillatable shaft carried by said brackets, ground engaging teeth carried by the shaft, an arm on the shaft, an arm formed for detachable engagement with the operating shaft of the grain drill, and a link connecting the arms, the extremities of the link being adjustable upon each of said arms whereby to adjust the lift of the teeth and the degree of depression thereof.

3. A cultivator attachment for grain drills including supporting elements having means whereby they may be engaged with the frame of a drill and project forwardly therefrom, brackets extending downwardly from the elements, an oscillatable shaft carried by said brackets, the shaft comprising a beam having its extremities bent upward and pivotally bolted to said brackets, cultivator teeth detachably carried on said shaft, an arm carried on the shaft, an arm formed for engagement on the operating shaft of the drill, and a link connecting the arms.

4. A cultivator attachment for grain drills including supporting elements having means whereby they may be detachably engaged with the frame of a drill and projecting forwardly therefrom, brackets extending downwardly from the forward ends of said elements, a shaft disposed between the brackets and comprising a beam channel-shaped in cross section and upwardly turned at its ends, pivot bolts passing through the upwardly turned ends of the shaft and through said brackets swingingly supporting the shaft, spring teeth having their upper ends curved to extend over the upper face of said shaft, detachable clamping members engaging the shaft and said teeth to hold the teeth in place, the clamping members being so formed as to prevent lateral movement of the teeth, an arm extending upward from the shaft, and means whereby the arm may be connected to the operating mechanism of the drill to cause an oscillation of the shaft and a lifting of the teeth when the grain drill shoes are raised.

5. A cultivator attachment for grain drills including supporting elements having means whereby they may be detachably engaged with the frame of a drill and project forwardly therefrom, brackets detachably mounted upon the forward ends of the supporting elements, a pair of alined shafts mounted between said brackets and carrying cultivator teeth, each of said shafts having an upwardly extending arm, an arm formed for engagement on the shoe operating shaft of the drill, and a link connecting the arms.

6. A cultivator attachment for grain drills including supporting elements having means whereby they may be detachably engaged with the frame of a drill and project forwardly therefrom, brackets detachably mounted upon the forward ends of the supporting elements and extending downwardly therefrom, a pair of alined shafts mounted between said brackets and carrying cultivator teeth, each of said shafts having an upwardly extending arm, an arm formed for engagement on the shoe operating shaft of the drill, and a link connecting the arms, the link being formed in two sections, a compression spring being disposed between said sections and resisting lengthening of the link.

7. The combination with a planter having grain drill shoes and a pair of shafts for raising or depressing said shoes, and means for operating said shafts, of supporting elements forwardly extending from the frame of the planter, brackets attached to the forward ends of said elements and extending downwardly therefrom, there being a plurality of pairs of said brackets, a shaft disposed between each pair of brackets and pivotally engaged therewith, spring teeth detachably mounted upon said shafts, an arm extending upwardly from each of the last named shafts, an arm extending downwardly from each of the first-named operating shafts, and a link connection between each of said last named arms and the corresponding arms on the second-named shafts.

8. The combination with a planter having grain drill shoes, a pair of shafts for raising or depressing said shoes, and means for operating said shafts, of supporting elements forwardly extending from the frame of the planter, brackets attached to the forward ends of said elements and extending downwardly therefrom, there being a plurality of pairs of said brackets, a shaft disposed between each pair of brackets and pivotally engaged therewith, spring teeth detachably mounted upon said shafts, an arm extending upward from each of the last named shafts, an arm extending downward from each of the first-named operating shafts, and a link connection between each of said last named arms and the corresponding arm on the second-named shafts, said links being adjustable upon the arms toward or from the shafts.

In testimony whereof we hereunto affix our signatures.

ALBERT KLINKHAMMER.
HENRY DYRSSEN.